United States Patent [19]

Terasawa

[11] Patent Number: 5,156,490
[45] Date of Patent: Oct. 20, 1992

[54] SHIELD TUNNELLING APPARATUS

[75] Inventor: Fumiaki Terasawa, Chiba, Japan

[73] Assignee: Kabushiki Kaisha Iseki Kaihatsu Koki, Tokyo, Japan

[21] Appl. No.: 677,621

[22] Filed: Mar. 28, 1991

[30] Foreign Application Priority Data

Mar. 29, 1990 [JP] Japan ................ 2-78847

[51] Int. Cl.$^5$ ............. E21D 9/00; G01B 11/27; E21B 44/00
[52] U.S. Cl. ............. 405/141; 33/DIG. 21; 33/286; 299/1.3; 356/138; 356/153; 405/138; 405/146
[58] Field of Search ............. 405/138, 141, 143, 146; 299/1.3; 33/1 H, 286, DIG. 21; 356/153, 140, 141, 139, 142, 255, 138

[56] References Cited

U.S. PATENT DOCUMENTS

| | | | |
|---|---|---|---|
| 3,498,673 | 3/1970 | Ledray et al. | 299/1 |
| 3,785,738 | 1/1974 | Hoppke | 356/138 |
| 3,861,803 | 1/1975 | Sallans | 356/255 X |
| 4,027,210 | 5/1977 | Weber | 299/1 X |
| 4,311,411 | 1/1982 | Akesaka et al. | 405/143 |
| 4,392,744 | 7/1983 | Tatsuhama et al. | 299/1 X |
| 5,085,509 | 2/1992 | Gaffard et al. | 356/153 |

FOREIGN PATENT DOCUMENTS

| | | | |
|---|---|---|---|
| 0235793 | 9/1989 | Japan | 405/143 |
| 0514052 | 7/1976 | U.S.S.R. | 405/143 |

Primary Examiner—Dennis L. Taylor
Attorney, Agent, or Firm—Stoel Rives Bolev Jones & Grey

[57] ABSTRACT

A shield tunnelling apparatus is provided that includes a first tubular shield body in which a cutter assembly for excavation and a drive mechanism for driving the cutter assembly are disposed; a second shield body connected to the rear of the first shield body so as to have a common axis therewith; a target disposed in the first shield body so as to receive a light ray directed along the axis; first optical path changing means disposed in the second shield body and capable of changing the optical path of the light ray directed toward the target such that the light ray travels along an optical path displaced away from the axis; and second optical path changing means disposed in the second shield body and capable of changing the optical path of the light ray passing through the first optical path changing means such that the light ray is again directed along the axis.

2 Claims, 2 Drawing Sheets

SHIELD TUNNELLING APPARATUS

BACKGROUND OF THE INVENTION

1. Field of the Invention

This invention relates to a shield tunnelling apparatus provided with a target for receiving a light ray directed along the axis of a shield body.

2. Description of the Prior Art

In some pipe propulsion engineering methods, a shield tunnelling apparatus and a main thrusting apparatus for advancing the tunnelling apparatus are used together with pipes following the tunnelling apparatus. When the direction of advance (advance direction) of the tunnelling apparatus deviates from a planned line of a tunnel to be constructed, directional correction is carried out.

This kind of directional correction is generally done using a light ray such as a laser beam directed along the axis of the tunnel to be constructed as a reference line. A target for receiving the light ray is disposed in the tunnelling apparatus. The advance direction of the tunnelling apparatus is then corrected such that the light ray is incident on a predetermined portion of the target.

Since the light ray acts as the reference line, the travelling direction of the light ray is along the axis (planned reference line) of the tunnel to be constructed, and the target is disposed such that the center of the target is aligned with the axis of the tunnelling apparatus.

When the axis of the tunnelling apparatus is aligned with the planned reference line, the light ray travels along the axis of the tunnelling apparatus and is incident on the center of the target.

On the other hand, when the axis of the tunnelling apparatus deviates from the planned reference line, the light ray is not incident on the center of the target. In this case, the advance direction of the tunnelling apparatus is corrected such that the light ray is incident on the center of the target.

For a tunnel having a bore which is too small to allow an operator to enter, the installations disposed in the shield body of the tunnelling apparatus hinder the light ray from travelling along the axis of the tunnel, however. Particularly when the excavation distance is long, an auxiliary pump for draining excavated matter should be disposed in the tunnelling apparatus. This auxiliary pump blocks the light ray, however. In tunnelling apparatus in which a light ray is directed along the axis of the tunnel, the size and amount of installations that may be disposed in the shield body are limited.

To solve the installation limitation problem, a light ray directed away from the axis of the tunnel is used. In this case, however, a reference line for measurement deviates from the axis of the tunnel, and the directional correction should therefore be conducted considering the displacement of the light ray from the axis of the tunnel. As a result, the directional correcting operation becomes troublesome.

SUMMARY OF THE INVENTION

An object of the present invention is to provide a shield tunnelling apparatus capable of disposing the installations at a position along the axis of a shield body, despite the use of a light ray directed along the axis of a tunnel.

A shield tunnelling apparatus according to the present invention includes a first tubular shield body to which a cutter assembly for excavation and a drive mechanism for driving the cutter assembly are attached; a second shield body connected to the rear of the first shield body so as to have a common axis with the first shield body; a target disposed in the first shield body so as to receive a light ray directed along the shield body axis; first optical path changing means disposed in the second shield body and capable of changing the optical path of a light ray directed toward the target such that the light ray travels along an optical path displaced away from the axis; and second optical path changing means disposed in the second shield body and capable of changing the optical path of the light ray passing through the first optical path changing means such that the light ray is directed along the above-mentioned axis.

A light ray emitted from a light source installed in a start shaft or the like is directed along the axis of the tunnel to be constructed, then along the optical path displaced away from the axis of the tunnelling apparatus by the first optical path changing means in the second shield body, and subsequently along the axis of the tunnelling apparatus by the second optical path changing means.

According to the present invention, installations of a size sufficient to block the axis of the tunnelling apparatus can be disposed within a space between the first and second optical path changing means, in spite of using the light ray directed along the axis of the tunnel as a reference line.

The first optical path changing means can be provided with a first reflector for deflecting the light ray outward in the radial direction of the second shield body, and a second reflector for deflecting the light ray deflected by the first reflector in the direction parallel to the axis.

The second optical path changing means can be provided with a third reflector for deflecting the light ray deflected by the second reflector toward the axis, and a fourth reflector for deflecting the light ray deflected by the third reflector such that the light ray is advanced along the axis.

BRIEF DESCRIPTION OF THE DRAWINGS

The foregoing and other objects and features of the invention will become apparent from the following description of a preferred embodiment of the invention with reference to the accompanying drawings, in which.

DETAILED DESCRIPTION OF THE PREFERRED EMBODIMENT

Figure 1:
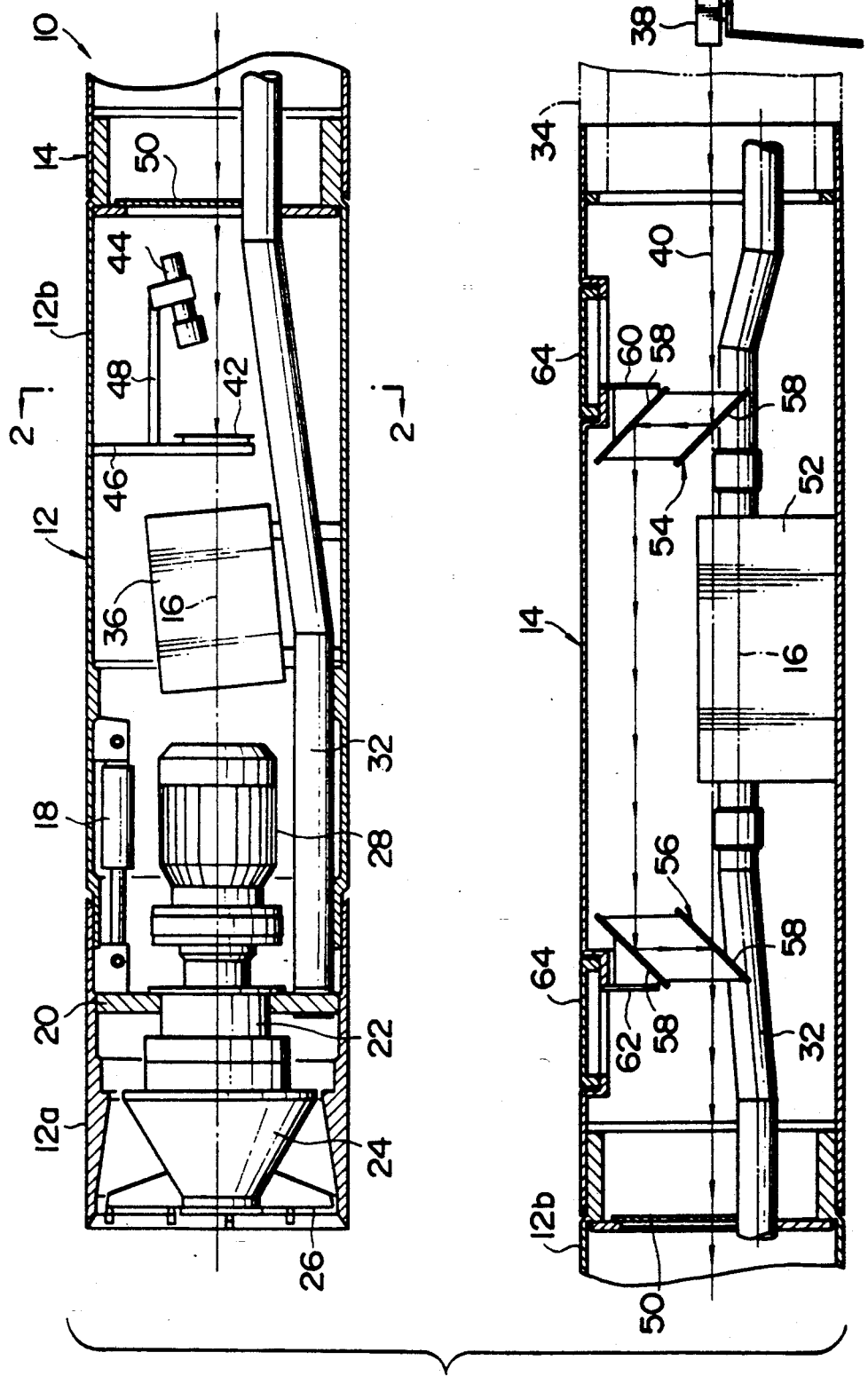
FIG. 1 is a sectional view of an embodiment of a shield tunnelling apparatus according to the present invention.

Referring to FIG. 1, a shield tunnelling apparatus 10 includes a first tubular shield body 12 and a second shield body 14 connected to the rear of the first shield body 12. Both shield bodies 12, 14 are butted against each other so as to have a common axis 16, and separably connected to each other by a plurality of bolts.

The first shield body 12 is divided into two tubular portions 12a, 12b. The front end of tubular portion 12b is slidably received in the rear end of tubular portion 12a, and the rear end of tubular portion 12b is connected to the front end of second shield body 14 by a plurality of bolts. Both tubular portions 12a, 12b are connected to each other by a plurality of direction-correcting jacks 18.

The interior of tubular portion 12a is partitioned into a front area and a rear area by a partition wall 20. The partition wall 20 is attached with a sleeve 22 extending in the direction of axis 16. The sleeve 22 rotatably supports a crankshaft (not shown) about the axis 16. The crankshaft is disposed such that an eccentric portion of the crankshaft is placed in the front area.

The eccentric portion of the crankshaft rotatably supports a rotor 24, and a cutter assembly 26 is mounted on rotor 24. The cutter assembly 26 is a well-known cutter assembly provided with a plurality of arms extending radially outward from the rotor 24 radially outward and a plurality of cutter bits respectively mounted on the tips of the arms.

The partition wall 20 is further attached to a rotary mechanism 28 for rotating the crankshaft. The rotor 24 and the cutter assembly 26 are constituted such that the turning motion (revolution) around the axis 16 and rotational motion (rotation around its own axis) around the eccentric portion of the crankshaft are performed through the rotation of the crankshaft. Such constitution is known and disclosed in Japanese Patent Public Disclosure (KOKAI) No. 63-189596, for example, and a detailed description thereof will therefore be omitted.

Figure 2:
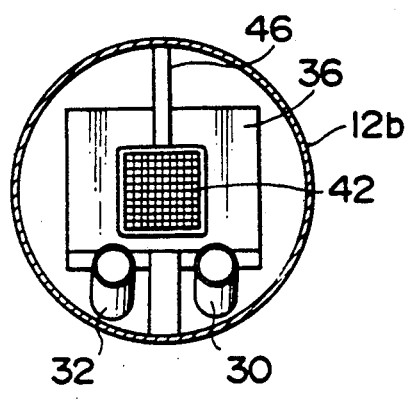
FIG. 2 is a sectional view taken along a line 2—2 in FIG. 1.

Muddy water for draining excavated matter is supplied from the ground side to the front area of tubular portion 12a through a water supply pipe 30 (See FIG. 2). The muddy water supplied to the front area of tubular portion 12a is drained together with the excavated matter to the ground side through a drain pipe 32. The water supply pipe 30 and drain pipe 32 extend to the ground surface through the tubular portion 12b, the second shield body 14, a pipe 34 such as a concrete pipe and a start shaft (not shown).

Disposed in the tubular portion 12b are a plurality of installations (equipment) 36 such as a relay and an electromagnetic valve for controlling the operations of the jack(s) 18 and the rotary mechanism 28; a target 42 for receiving a light ray 40, such as a laser beam emitted from a light source 38 installed in the start shaft; and a television camera 44 for taking a picture of the target 42. The light source 38 is disposed such that the light ray 40 is directed along the axis (planned reference line) of a tunnel to be constructed.

As shown in FIG. 2, the target 42 includes a rectangular panel having ruled lines in the form of a checkerboard. The target 42 is mounted on the tubular portion 12b through a bracket 46 such that the center of the target 42 is aligned with the axis 16. The television camera 44 is mounted on the bracket 46 through a bracket 48 such that the television camera 44 takes a picture of the whole target 42. A video image taken by the television camera 44 is displayed on a monitor installed on the ground.

When the shield tunneling apparatus 10 is provided with an indicator for pressure supplied to the jack(s) 18, an indicator for the amount of expansion and shrinkage of the jack(s) 18, an indicator for pressure in the front area or like indicators, these indicators may be disposed in proximity to the target 42 and photographed together with the target 42 by the television camera 44.

The rear end of the tubular portion 12b is closed by a transparent plate 50. A space between the partition wall 20 in the first shield body 12 and the transparent plate 50 is partitioned from the outside, so that equipment disposed in the space is protected against exterior moisture and dust or the like.

Disposed in the second shield body 14 are an auxiliary pump 52 for sending the muddy water from the front area to the ground side and a pair of optical path changing units 54, 56 for changing the optical path of the light ray 40.

The first and second optical path changing units 54, 56 are disposed on opposite sides of the auxiliary pump 52. Each optical path changing unit 54, 56 is provided with a pair of reflectors 58 disposed parallel to each other. The optical path changing units 54, 56 are supported respectively by brackets 60, 62 mounted on the second shield body 14.

One reflector 58 of the first optical path changing unit 54 is disposed to deflect the light ray 40 travelling along the axis 16 outward in the radial direction of the second shield body 14, e.g., upward. Another reflector 58 is disposed to direct the light ray 40 deflected by the above-mentioned one reflector 58 along a path parallel to the axis 16 and located a distance from the axis 16.

One reflector 58 of the second optical path changing unit 56 is disposed to direct the light ray 40 sent through the first optical path changing unit 54 toward the axis 16 by the above-mentioned one reflector 58. Another reflector 58 is disposed to direct the light ray 40 along the axis 16.

A hole closed by a lid 64 is formed in each end of the second shield body 14. The holes are utilized when the first and second shield bodies 12, 14 are connected to each other and disconnected from each other, when the optical path changing units 54, 56 are mounted and removed, when the water supply pipe 30 is connected and disconnected, and when the drain pipe 32 is connected and disconnected.

When the tunnelling apparatus 10 is properly advanced so that the axis 16 of the tunnelling apparatus 10 is aligned with the planned reference line, the light ray 40 is directed along the axis 16 to reach the first optical path changing unit 54, then directed by the first optical path changing unit 54 toward an optical path avoiding the auxiliary pump 52 and incident on the second optical path changing unit 56, then directed by the second optical path changing unit 56 toward the axis 16 and finally incident on the center of the target 42. Accordingly, the light ray 40 is not hindered from travelling by the auxiliary pump 52.

When the tunnelling apparatus 10 is not properly advanced, the axis 16 of the tunnelling apparatus 10 deviates from the planned reference line, the light ray 40 is directed along an optical path deviated from the axis 16, so that the light ray 40 is finally incident on a portion of the target 42 displaced from the center of the target 42. Since the light ray 40 is also directed by the first and second optical path changing units 54, 56 toward the optical path avoiding the auxiliary pump 52, the light ray 40 is still not hindered from travelling by the auxiliary pump 52.

What is claimed is:

1. A shield tunnelling apparatus, comprising:
    a first tubular shield body to which a cutter assembly for excavation and a drive mechanism for driving said cutter assembly are attached;
    a second tubular shield body connected to the rear of said first shield body so as to have a common axis with said first shield body;

a target disposed in said first shield body so as to receive a light ray directed along said axis of said second shield body;

one or more installations disposed in said second shield body, wherein such installations obstruct said axis;

first optical path changing means disposed in said second shield body at a position upstream of the installations and capable of changing an optical path of a light ray directed toward said target such that said light ray travels along an optical path displaced away from said axis of said second shield body; and second optical path changing means disposed in said second shield body at a position downstream of the installations and capable of changing the optical path of said light ray passing through said first optical path changing means such that said light ray travels along said axis;

wherein said first optical path changing means comprises a first reflector for deflecting said light ray outward in the radial direction of said second shield body; and a second reflector for deflecting the light ray deflected by said first reflector in a direction parallel to said axis of said second shield body, and wherein said second optical path changing means comprises a third reflector for deflecting the light ray deflected by said second reflector toward said axis; and a fourth reflector for deflecting the light ray deflected by said third reflector such that said light ray is advanced along said axis of the second shield body.

2. A shield tunnelling apparatus, comprising:

a first tubular shield body to which a cutter assembly for excavation and a drive mechanism for driving said cutter assembly are attached;

a second shield body connected to the rear of said first shield body so as to have a common axis with said first shield body;

a target disposed in said first shield body so as to receive a light ray directed along said axis of said second shield body;

one or more installations disposed in said second shield body, wherein such installations obstruct said axis;

first optical path changing means disposed in said second shield body at a position upstream of the installations and capable of changing an optical path of a light ray directed toward said target such that said light ray travels along an optical path displaced away from said axis of said second shield body; and second optical path changing means disposed in said second shield body at a position downstream of the installations and capable of changing the optical path of said light ray passing through said first optical path changing means such that said light ray travels along said axis;

wherein said first optical path changing means deflects said light ray from its path along said axis of said second shield body and then in a direction parallel to said axis of the second shield body, and wherein said second optical path changing means deflects said light ray toward said axis of said second shield body and then along said axis of the second shield body.

* * * * *